United States Patent [19]
Kimball

[11] Patent Number: 5,347,198
[45] Date of Patent: Sep. 13, 1994

[54] LOW COST AC SWITCH FOR ELECTROLUMINESCENT LAMPS

[75] Inventor: Robert A. Kimball, Scottsdale, Ariz.

[73] Assignee: Durel Corporation, Tempe, Ariz.

[21] Appl. No.: 69,738

[22] Filed: Jun. 1, 1993

[51] Int. Cl.$^5$ .............................. H05B 37/00
[52] U.S. Cl. ............... 315/167; 315/169.3; 315/324; 315/209 R
[58] Field of Search ............. 315/169.3, 167, 240, 315/362, 227 R, 324, 209 R; 307/248, 246, 543, 546, 551

[56] References Cited

U.S. PATENT DOCUMENTS

| | | | |
|---|---|---|---|
| 3,813,575 | 5/1974 | Webb | 315/167 |
| 3,908,150 | 9/1975 | Webb | 315/167 |
| 5,095,248 | 3/1992 | Sato | 315/169.3 |
| 5,172,032 | 12/1992 | Alessio | 315/169.3 |

*Primary Examiner*—Robert J. Pascal
*Assistant Examiner*—Haissa Philogene
*Attorney, Agent, or Firm*—Cahill, Sutton & Thomas

[57] ABSTRACT

DC bias does not accumulate on an EL lamp connected in series with a switch circuit including, in one embodiment, two, asymmetric, parallel current paths, one current path for each half cycle of the AC. The first current path includes a first diode for preventing DC bias on the lamp, the first diode is in series with a first transistor between a first terminal and a second terminal. The second current path includes a second diode in series with the base-collector junction of a second transistor between the first terminal and the second terminal. The base of the first transistor is connected to the emitter of the second transistor and to a control terminal. The first transistor and the second transistor are opposite conductivity types. The second current path takes advantage of the fact that the current through an electroluminescent lamp is small and uses the control terminal as a source of current for the lamp. In another embodiment, a large capacitor in series with the electroluminescent lamp prevents DC bias from accumulating on the EL lamp.

9 Claims, 2 Drawing Sheets

LOW COST AC SWITCH FOR ELECTROLUMINESCENT LAMPS

BACKGROUND OF THE INVENTION

This invention relates to a power supply for an electroluminescent (EL) lamp and, in particular, to a switch circuit for connecting an EL lamp to a source of alternating current (AC).

An EL lamp is essentially a capacitor having a dielectric layer between two conductive electrodes, one of which is transparent. The dielectric layer includes a phosphor powder which glows in the presence of a strong electric field and a very low current. Because an EL lamp is a capacitor, alternating current must be applied to the electrodes to cause the phosphor to glow, otherwise the capacitor charges to the applied voltage and the current through the EL lamp ceases.

For hand held devices and other applications such as automotive displays, an EL lamp is driven by an inverter which converts direct current from a battery into alternating current. In order for an EL lamp to glow sufficiently, a peak-to-peak voltage in excess of about one hundred and twenty volts is necessary. As known to those of skill in the art, the actual voltage depends on the construction of the lamp and, in particular, the field strength within the phosphor powder. The frequency of the alternating current through an EL lamp affects the life of the EL lamp, with frequencies below 1000 hz. being preferred. Too low of a frequency causes a noticeable flicker and low brightness. Thus, a frequency of 100-1000 hz. is preferred. Many types of inverters are commercially available for producing AC suitable for an EL lamp.

In many applications, such as automotive displays, EL lamps have a distinct advantage over other forms of lighting in the soft glow of the lamp when viewed directly. Other lamps produce a harsh glare and can only be used for indirect lighting. In addition, these other lamps are discrete (point) sources of light, requiring either a diffusing lens or a large number of small lamps to produce the desired visual effect. In either case, the cost of the display is high.

EL lamps can be manufactured in large area segments of various colors, producing striking displays. In many applications, not all segments are lit simultaneously and a suitable control circuit is needed. It is known in the prior art to drive a multi-segment display from a single inverter by individually grounding each segment through a series transistor, e.g. U.S. Pat. No. 3,908,150—Webb. In the circuit described in the Webb patent, a bipolar transistor and a lamp segment are connected in series across a source of alternating current.

A problem with this arrangement is the large DC bias that develops across a segment when the segment is off. The DC voltage is not sufficient to light the lamp but is sufficient to cause corrosion in a lamp exposed to environmental stress, e.g. temperatures considerably above room temperature (20° C.). The series bipolar transistor actually blocks AC in one direction only, causing the DC bias. Using other semiconductor switches instead of a bipolar transistor is possible but is more expensive and may introduce other problems. For example, a triac could be substituted for a bipolar transistor but a triac is more difficult to turn off when in series with an EL lamp because the EL lamp is a reactive load and causes a large phase shift between voltage and current. In addition, even the least expensive triacs are more expensive than a suitable bipolar transistor.

In view of the foregoing, it is therefore an object of the invention to provide a low cost circuit for driving an EL lamp from an AC source.

Another object of the invention is to provide an interface circuit for coupling integrated circuit logic devices to an AC powered EL lamp.

A further object of the invention is to provide a switch circuit for preventing DC bias in an EL lamp driven by an AC source.

SUMMARY OF THE INVENTION

The foregoing objects are achieved in the invention in which a luminous display powered by alternating current includes a plurality of display elements connected between a pair of rails. Each display element includes a single EL lamp, or one segment of a multi-segment EL lamp. For convenience of description, each display element is assumed to be a single EL lamp. Each display element also includes a switch transistor and means for preventing a DC bias on the EL lamp, all connected in series between a pair of rails connected to a source of alternating current.

In accordance with one aspect of the invention, the switch transistor is included in a circuit having two, parallel, asymmetric current paths, one current path for each half cycle of the AC. The first current path includes a first diode in series with a first transistor (the switch transistor) between a first terminal and a second terminal. The second current path is asymmetrical to the first current path in that the second current path includes the same devices as the first current path but the devices are connected differently. Specifically, a second diode is in series with the base-collector junction of a second transistor between the first terminal and the second terminal. The paths are joined at a control terminal where the base of the first transistor is connected to the emitter of the second transistor. The first transistor and the second transistor are bipolar transistors of opposite conductivity types, e.g. the first transistor is NPN and the second transistor is PNP.

In accordance with a second aspect of the invention, the means for preventing DC bias is a large capacitor connected in series with the EL lamp and the switch transistor. By "large" is meant a capacitor having a capacitance approximately ten times, or more, the capacitance of the EL lamp with which it is connected in series. Since the resistance of the lamp is much lower than the resistance of the capacitor, DC bias on the EL lamp is prevented.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
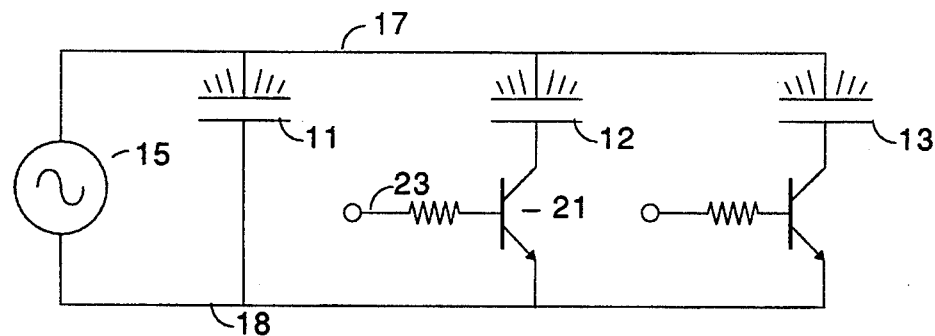
FIG. 1 illustrates a switch circuit constructed in accordance with the prior art.

In FIG. 1, lamps 11, 12, and 13 are connected in parallel to alternating current source 15. Lamp 11 is connected between supply rail 17 and ground rail 18. Transistor 21 is connected in series with lamp 12 between supply rail 17 and ground rail 18 and transistor 22 is connected in series with lamp 13 between rails 17 and 18. The base of transistor 21 is connected through a resistor to control terminal 23 and the base of transistor 22 is connected through a resistor to control terminal 24.

Figure 2:
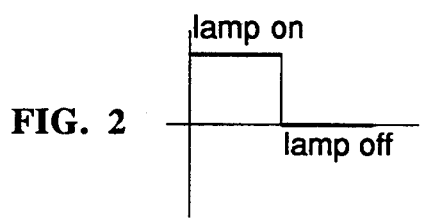
FIG. 2 is a waveform of a control signal for the circuits illustrated in FIGS. 1 and 3.

Lamp 11 remains on as long as source 15 is connected to the rails and lamps 12 and 13 are on or off depending upon whether or not the switch transistors are conducting or non-conducting. FIG. 2 illustrates a signal applied to control terminal 23. when the signal on terminal 23 is high, transistor 21 conducts, connecting lamp 12 to rails 17 and 18. Since rail 18 is grounded, rail 17 swings positive and negative relative to rail 18. When rail 17 is positive, transistor 21 conducts current through lamp 12 to rail 18. When rail 17 is negative, the current through lamp 12 flows through the forward biased collector-base junction of transistor 21.

If terminal 23 is at ground potential, transistor 21 is turned off and current does not flow through the lamp when rail 17 is positive. However, when rail 17 is negative, current flows through the forward biased collector-base junction of transistor 21. This pulsed direct current produces a DC bias on lamp 12, i.e. the upper electrode becomes negative with respect to lower electrode. If the lamp remains off long enough, the DC bias equals the nominal AC voltage. As described above, the DC bias deteriorates the lamp, especially in hostile environments.

Figure 3:
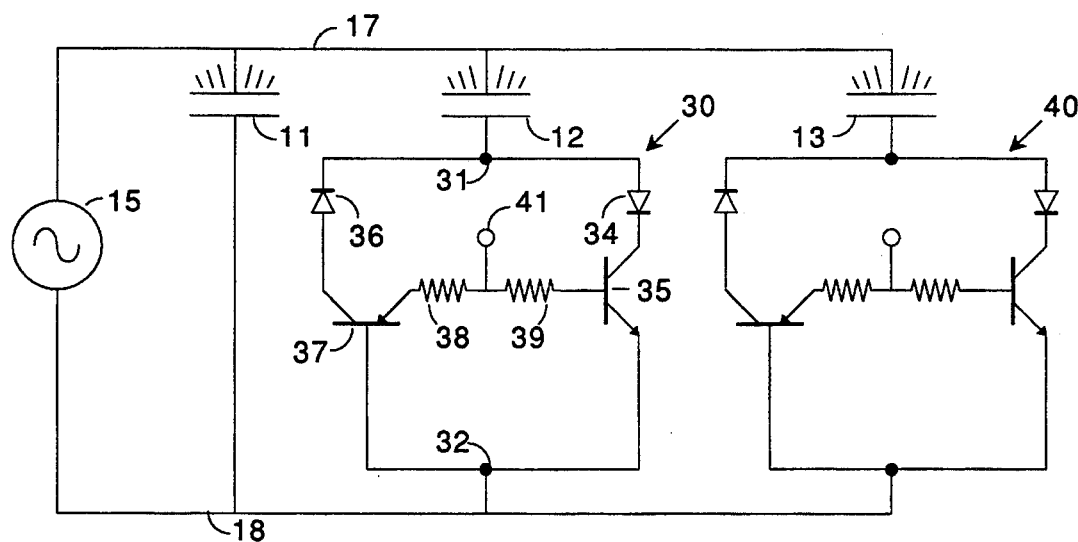
FIG. 3 illustrates a switch circuit constructed in accordance with a preferred embodiment of the invention.

FIG. 3 illustrates a luminous display in which some of the lamps are controlled individually by separate switch circuits. Each switch circuit includes two, parallel, asymmetrical current paths and prevents conduction on both halves of the alternating current. Switch circuit 30 includes two current paths connected between terminals 31 and 32. A first current path includes diode 34 series connected with transistor 35. A second current path includes diode 36 and transistor 37. Transistors 35 and 37 are of opposite conductivity type. Specifically, transistor 35 is NPN type and transistor 37 is PNP type. Diode 36 is connected in series with the collector-base junction of transistor 37 and the base of transistor 35 is connected to the emitter of transistor 37 through resistors 38 and 39. The junction of resistors 39 is connected to control terminal 41.

The junction in diode 34 and the collector-base junction of transistor 35 are oppositely poled, i.e. when transistor 35 is off, the current path through lamp 12 to terminal 41 includes diode 34 and the diode formed by the collector-base junction of transistor 35. Since transistor 35 is NPN type, the cathode of diode 34 is connected to the cathode of the collector-base diode. The DC path to terminal 41 is blocked and no DC bias can accumulate on lamp 12. Similarly, the connection of diode 36 to transistor 37 produces oppositely poled junctions preventing current flow between terminals 31 and 32 when transistor 37 is not conducting.

In operation, a logic "high" voltage is an enabling signal on control terminal 41 which forward biases the emitter-base junctions of transistors 35 and 37, turning on the transistors. When rail 17 is positive, current flows through lamp 12, diode 34 and transistor 35 to rail 18. When rail 17 is negative, current flows from terminal 41, through resistor 38, transistor 37, diode 36, and lamp 12 to rail 17.

Since transistors of opposite conductivity type are used, a single control terminal operates both transistors in unison, simplifying drive requirements. Switch circuit 30 takes advantage of the fact that the current through an electroluminescent lamp is very small; typically less than ten milliamps for a lamp having an area of twenty-five $cm^2$. Since the current is so small, one can use control terminal 41 as a current source. Terminal 41 can be connected to an integrated circuit logic device such as an AND or an OR circuit, to a shift register, or to the output port of a microcontroller or microcomputer. Because of the asymmetric current paths, one obtains a suitable switch circuit having relatively few components and a single control terminal.

To extinguish lamp 12, a disabling signal is applied to terminal 41, i.e. terminal 41 is held at ground potential. The emitter-base junctions of transistors 35 and 37 are no longer forward biased and the transistors are non-conductive. When rail 17 is positive, diode 34 is forward biased, but the base-collector junction of transistor 35 is reversed biased and no current flows in the right-hand current path; the base-collector junction of transistor 37 is forward biased, but diode 36 is reversed biased and no current flows in the left-hand current path. When rail 17 is negative, the base-collector junction of transistor 35 is forward biased, but diode 34 is reversed biased and no current flows in the right-hand current path; diode 36 is forward biased, but the base-collector junction of transistor 37 is reversed biased and no current flows in the left-hand current path.

Switch circuit 40 is the same as switch circuit 30 and controls the lighting of lamp 13. As in the circuit shown of FIG. 1, lamp 11 remains lit as long as source 15 is connected to rails 17 and 18.

Figure 4:
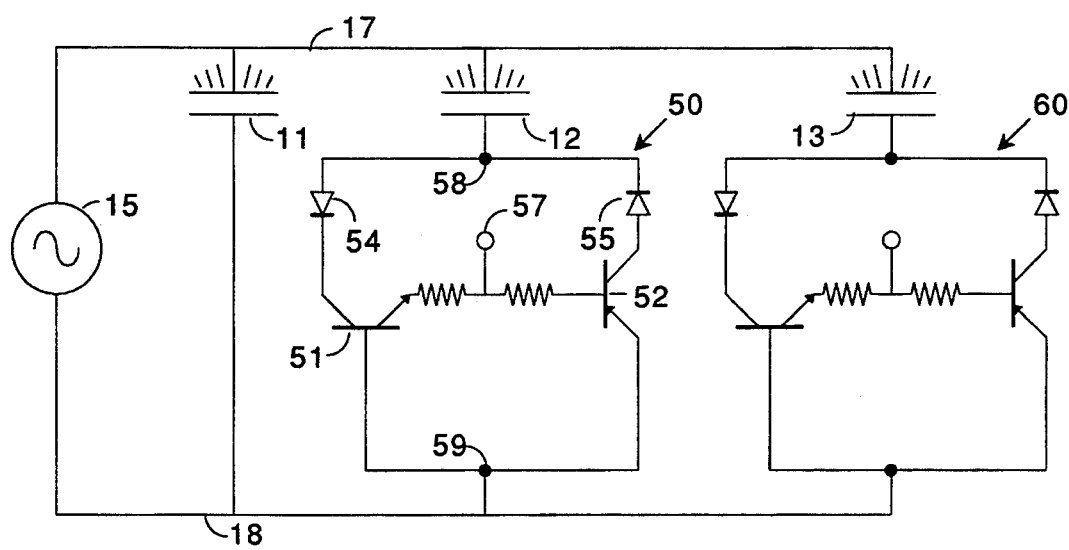
FIG. 4 is an alternative embodiment of the circuit shown in FIG. 3.

FIG. 4 illustrates an alternative embodiment of the invention in which the conductivity types of the transistors are reversed in the current paths, as compared to the circuit of FIG. 3. In switch circuit 50, transistor 51 is an NPN transistor and transistor 52 is a PNP transistor. Because the conductivity types are reversed, the polarity of the series diodes are also reversed, i.e. the cathode of diode 54 is connected to the collector of transistor 51 and the anode of diode 55 is connected to the collector of transistor 52.

Figure 5:
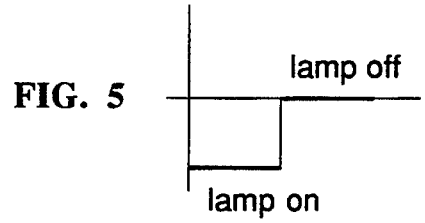
FIG. 5 is a waveform of a control signal for the circuit illustrated in FIG. 4.

When a logic "high" voltage is applied to terminal 57, the left-hand current path conducts when rail 17 is positive and the right hand current path conducts when rail 17 is negative. As shown in FIG. 5, a logic "high" voltage for switch circuit 50 is a negative voltage. When terminal 57 is held at ground potential, there is no current path between terminals 58 and 59 and lamp 12 is extinguished without accumulating a DC bias.

One embodiment of the invention used the following components. The cost of these components is less than the cost of a single thyristor.

| | |
|---|---|
| transistor 35 | MPSA42 |
| transistor 37 | MPSA92 |
| diode 34 | 1N4004 |
| diode 36 | 1N4004 |
| resistor 38 | 1 kΩ |

| -continued | |
|---|---|
| resistor 39 | 10 kΩ |

Figure 6:
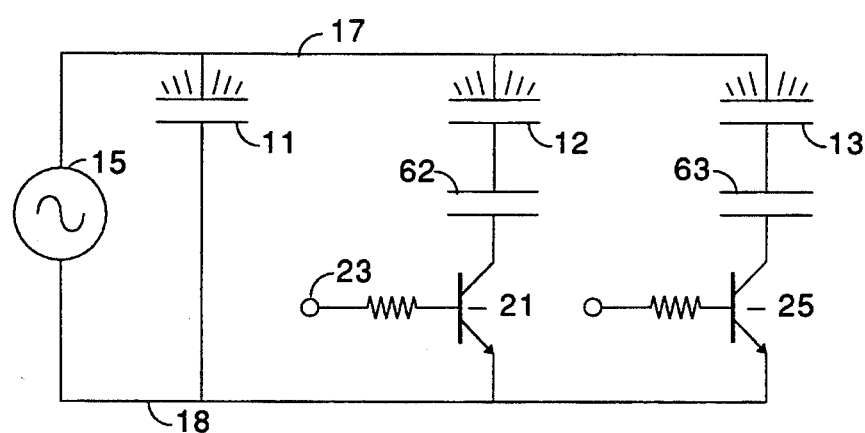
FIG. 6 illustrates a circuit constructed in accordance with an alternative embodiment of the invention.

FIG. 6 illustrates an alternative embodiment of the invention in which a series capacitor prevents DC bias from accumulating on an EL lamp in the off state. The circuit shown in FIG. 6 differs from the circuit shown in FIG. 1 by the addition of capacitors 62 and 63. Capacitor 62 is connected in series between lamp 12 and switch transistor 21. Capacitor 62 has a large capacitance relative to the capacitance of lamp 12, about ten times the capacitance of the lamp. For example, an EL lamp typically has a capacitance of about 3 nf/in$^2$. A display segment of four square inches has a capacitance of about 12 nf. In this case, capacitor 62 preferably has a value of about 0.1 µf. Since an EL lamp is a "leaky" capacitor, the AC and DC characteristics of this circuit are very different and this difference is exploited to prevent the accumulation of a DC bias.

When transistor 21 is conducting, there is an alternating current through lamp 12 and capacitor 62. The series connected lamp and capacitor are a voltage divider and about ninety percent of the applied voltage appears across lamp 12 because the impedance of lamp 12 is about ten times the impedance of capacitor 62.

When transistor 21 is not conducting, there is a pulsed DC through lamp 12 and capacitor 62. In this case, it is the resistances of the components which must be considered in analyzing the voltage divider. The resistance of a capacitor is essentially infinite whereas the resistance of lamp 12 is typically 25–100 megohms. Since the resistance of capacitor 62 is so much greater than the resistance of lamp 12, a DC bias accumulates on capacitor 62. DC bias on lamp 12 is not measurable, even though there is conduction through the collector-base junction of transistor 21 on negative half cycles of the alternating current from source 15.

The electrical equivalent of an EL lamp is a capacitor and a resistor connected in parallel, i.e. an EL lamp leaks charge. If lamp 12 were a "true" capacitor, the circuit could not work in the same way and there would be a DC bias on lamp 12 in the off state.

The invention thus provides, in one embodiment, a low cost circuit, compatible with integrated circuit logic devices, for driving an EL lamp from an AC source and for preventing DC bias in an EL lamp driven by an AC source. Another embodiment provides a low cost circuit which does not apply a DC bias to the lamp but slightly reduces the applied voltage when the lamp is turned on.

Having thus described the invention, it will be apparent to those of skill in the art that various modifications can be made within the scope of the invention. For example, the components can be arranged in any order in the current path. In FIG. 6, lamp 12 and capacitor 62 can be interchanged, although typically they would not be interchanged since a display often uses a single, multi-segment lamp having one electrode common to all of the segments. This structure requires that the lamp be connected as shown in FIG. 6.

I claim:

1. A switch circuit for series connection between an electroluminescent lamp and a source of alternating current, said switch circuit comprising:
   a first terminal for connection to said electroluminescent lamp, a second terminal for connection to said source, and a control terminal;
   a first current path including a first transistor and a second current path including a second transistor, wherein said first current path and said second current path are connected in parallel between said first terminal and said second terminal and wherein said first transistor and said second transistor are connected to said control terminal;
   wherein said first current path and said second current path conduct on alternate half cycles of said alternating current when an enabling signal is applied to said control terminal and wherein neither current path conducts when a disabling signal is applied to said control terminal, thereby preventing DC bias from accumulating on said lamp.

2. The switch circuit as set forth in claim 1 wherein said first current path and said second current path are asymmetrical.

3. The switch circuit as set forth in claim 2 wherein said first current path further includes a first diode connected in series with said first transistor;
   said second current path further includes a second diode, wherein said second diode is connected in series with the collector-base junction of said second transistor; and
   wherein the base of said first transistor is connected to the emitter of said second transistor and to said control terminal.

4. The circuit as set forth in claim 3 wherein said first transistor and said second transistor are bipolar transistors of opposite conductivity types.

5. The circuit as set forth in claim 4 wherein said first diode and said first transistor are connected to produce oppositely poled junctions and said second diode and said second transistor are connected to produce oppositely poled junctions.

6. A display comprising:
   a first rail and a second rail for connection to a source of alternating current;
   an electroluminescent lamp having a first electrode connected to said first rail and a second electrode;
   a transistor having a first electrode, a control electrode, and a second electrode, wherein said second electrode of said transistor is connected to said second rail; and
   a large capacitor connected between said second electrode of said electroluminescent lamp and said first electrode of said transistor.

7. A luminous display having a first rail and a second rail for connection to a source of alternating current and having a plurality of display elements connected between said rails, wherein each display element comprises:
   an electroluminescent lamp having a first electrode and a second electrode, wherein said first electrode is connected to said first rail;
   a switch transistor having a first electrode, a control electrode, and a second electrode, wherein said second electrode of said switch transistor is connected to said second rail; and
   means for preventing DC bias on said electroluminescent lamp, wherein said means is connected between said first electrode of said switch transistor and said second electrode of said electroluminescent lamp.

8. The display as set forth in claim 7 wherein said means is a large capacitor.

9. The display as set forth in claim 7 wherein said means is a diode and each of said display elements further comprises:
- a second transistor, said second transistor having a first electrode, a control electrode, and a second electrode, wherein said control electrode of said second transistor is connected to said second rail;
- a second diode connected between said second electrode of said electroluminescent lamp and said first electrode of said second transistor; and wherein said control electrode of said first transistor is connected to said second electrode of said second transistor.

* * * * *